United States Patent [19]

Roy

[11] Patent Number: 5,216,703
[45] Date of Patent: Jun. 1, 1993

[54] PIGGY-BACK NUMBER AND ROUTING ISOLATION FOR CELLULAR TELEPHONE SWITCHES

[75] Inventor: Alfred A. Roy, Baldwin Park, Calif.

[73] Assignee: PacTel Corporation, Walnut Creek, Calif.

[21] Appl. No.: 716,054

[22] Filed: Jun. 17, 1991

[51] Int. Cl.⁵ .......................................... H04M 11/00
[52] U.S. Cl. ..................................... 379/59; 379/201; 379/211; 379/355
[58] Field of Search ................. 379/59, 60, 63, 91, 379/143, 154, 201, 210, 211, 212, 355

[56] References Cited

U.S. PATENT DOCUMENTS

| | | | |
|---|---|---|---|
| 3,522,385 | 8/1966 | Stepan et al. | 379/183 |
| 3,564,149 | 2/1971 | Funk et al. | 379/280 |
| 3,579,254 | 5/1971 | Carmody et al. | 379/183 |
| 4,268,722 | 5/1981 | Little et al. | 379/63 |
| 4,757,267 | 7/1988 | Riskin | 379/113 |
| 4,763,191 | 8/1988 | Gordon et al. | 358/86 |
| 4,837,800 | 6/1989 | Freeburg et al. | 379/63 |

OTHER PUBLICATIONS

John L. Fike and George E. Friend, *Understanding Telephone Electronics* 1983, pp. 10-1 to 10-16.
Motorola, Inc., *Dyna T-A-C, Mobile and Portable Radio Telephone System* 1982, pp. 7-1, 7-9 and 7-55.

Primary Examiner—Curtis Kuntz
Assistant Examiner—Vijay Shankar
Attorney, Agent, or Firm—Merchant, Gould, Smith, Edell, Welter & Schmidt

[57] ABSTRACT

A piggy-back number and routing isolation method for cellular telephone switches. A cellular customer dials a *800xxxx number, wherein xxxx represents some combination of symbols of arbitrary length identifying a specific Third Party Advertiser (TPA). The switch uses the leading *800 portion of the dialed *800xxxx number as an access code to direct the call to a special trunk. The switch strips the leading *800 portion from the *800xxxx number and inserts in its place a dialing prefix before making a call through the special trunk. The number dialed by the switch out through the special trunk is the mobile phone number assigned to the TPA as a cellular customer. The special trunk "piggy-backs" the number translations and routing determinations because it is comprised of two ports of the single switch connected together in a "loop-back" manner, so that calls routed out the first port are received immediately by the same switch at the second port. When the switch receives the call coming in from the special trunk, it uses a call forwarding feature associated with the TPA's mobile phone number to route the call directly to the TPA's land-based phone number. Two billing records are thus created out of one call: the cellular customer dialing the *800xxxx number; and the TPA's mobile phone number dialing the TPA's land-based phone number.

19 Claims, 5 Drawing Sheets

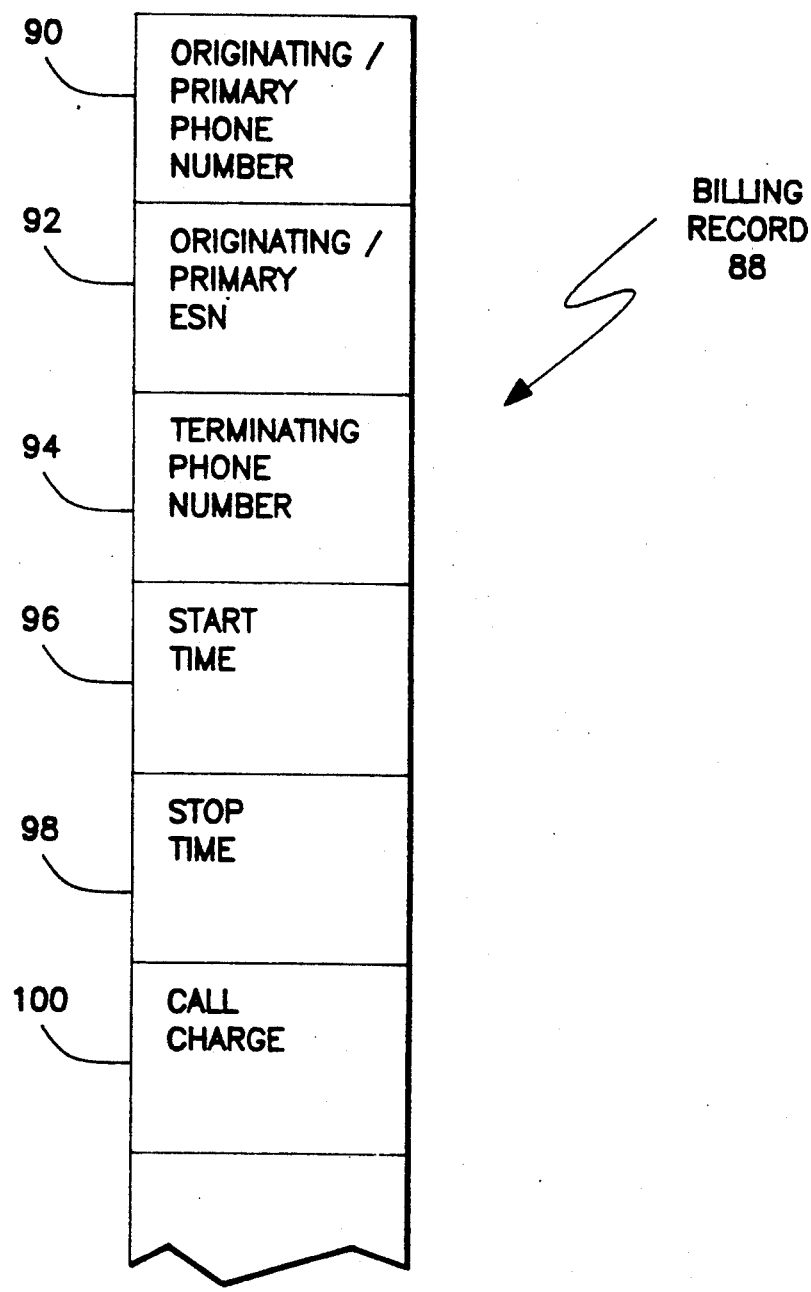

PIGGY-BACK NUMBER AND ROUTING ISOLATION FOR CELLULAR TELEPHONE SWITCHES

BACKGROUND OF THE INVENTION

1. Field of the Invention

This invention relates in general to cellular telephone systems, and in particular, to a method of implementing cellular "800" service.

2. Description of Related Art

Cellular telephones are as easily used as home telephones. Cellular telephones combine the mobility of the radio link and the world-wide land telephone network to provide a communication link to any other telephone in the world. However, the cellular telephone system has not progressed as far as the land telephone network in the services provided to customers. One major shortcoming is the lack of cellular "800" service.

One problem for existing cellular systems with regard to providing cellular 800 service is the billing of a land-based Third Party Advertiser (TPA). Currently, when a cellular user dials such a TPA, the cellular user is billed for associated air-time usage charges. A typical cellular billing system only allows the billing of actual cellular numbers for air-time usage of both incoming and outgoing calls. The charges that the cellular customer incurs cannot be charged instead to the TPA that the customer is dialing. Yet, under the cellular 800 service, the TPA and not the cellular user should be billed for the air-time usage during the period the cellular user is connected to the TPA.

Another problem for existing cellular systems with regard to providing cellular 800 service is that existing cellular switches are limited by the capacity of "translation tables" within the switch as to the number of unique 800 numbers that they can hold. This means that cellular 800 service would be available to only a limited number of TPAs. However, with the growing use of cellular systems, cellular 800 service has broad appeal and could result in thousands of potential TPAs.

SUMMARY OF THE INVENTION

To overcome the limitations in the prior art described above, and to overcome other limitations that will become apparent upon reading and understanding the present specification, the present invention discloses a piggy-back number and routing isolation method for cellular telephone switches, so that cellular 800 service can be provided. A cellular customer dials a *800xxxx number, wherein xxxx represents a combination of symbols of arbitrary length identifying a specific TPA. A cellular switch uses the leading *800 portion of the dialed *800xxxx number as an access code to direct the call to a special trunk. The switch strips the leading *800 portion from the *800xxxx number, and inserts in its place a dialing prefix before making a call through the special trunk. The number dialed by the switch on the special trunk is the TPA's mobile phone number. The special trunk "piggy-backs" the translation of the TPA's mobile phone number on the switch by transmitting it through two ports connected together in a "loop-back" manner, so that a call transmitted out the first port is received immediately by the same switch at the second port, thereby isolating the call from external facilities. When the switch receives the call from the second port, directed to the TPA's mobile phone number, the switch handles the call in a normal manner and uses a call forwarding feature associated with the TPA's mobile phone number to route the call directly to the TPA's land-based phone number. Two billing records are thus created out of one call: the first billing record is for the cellular customer dialing the *800xxxx number; and the second billing record is for the TPA's mobile phone number dialing the TPA's land-based phone number. Using these billing records, the TPA can be billed for air-time usage during the cellular customer's call to the TPA.

BRIEF DESCRIPTION OF THE DRAWINGS

Referring now to the drawings in which like reference numbers represent corresponding elements throughout:

FIG. 5 is a block diagram illustrating the billing record generated by the switch.

DETAILED DESCRIPTION OF THE PREFERRED EMBODIMENT

Figure 1:
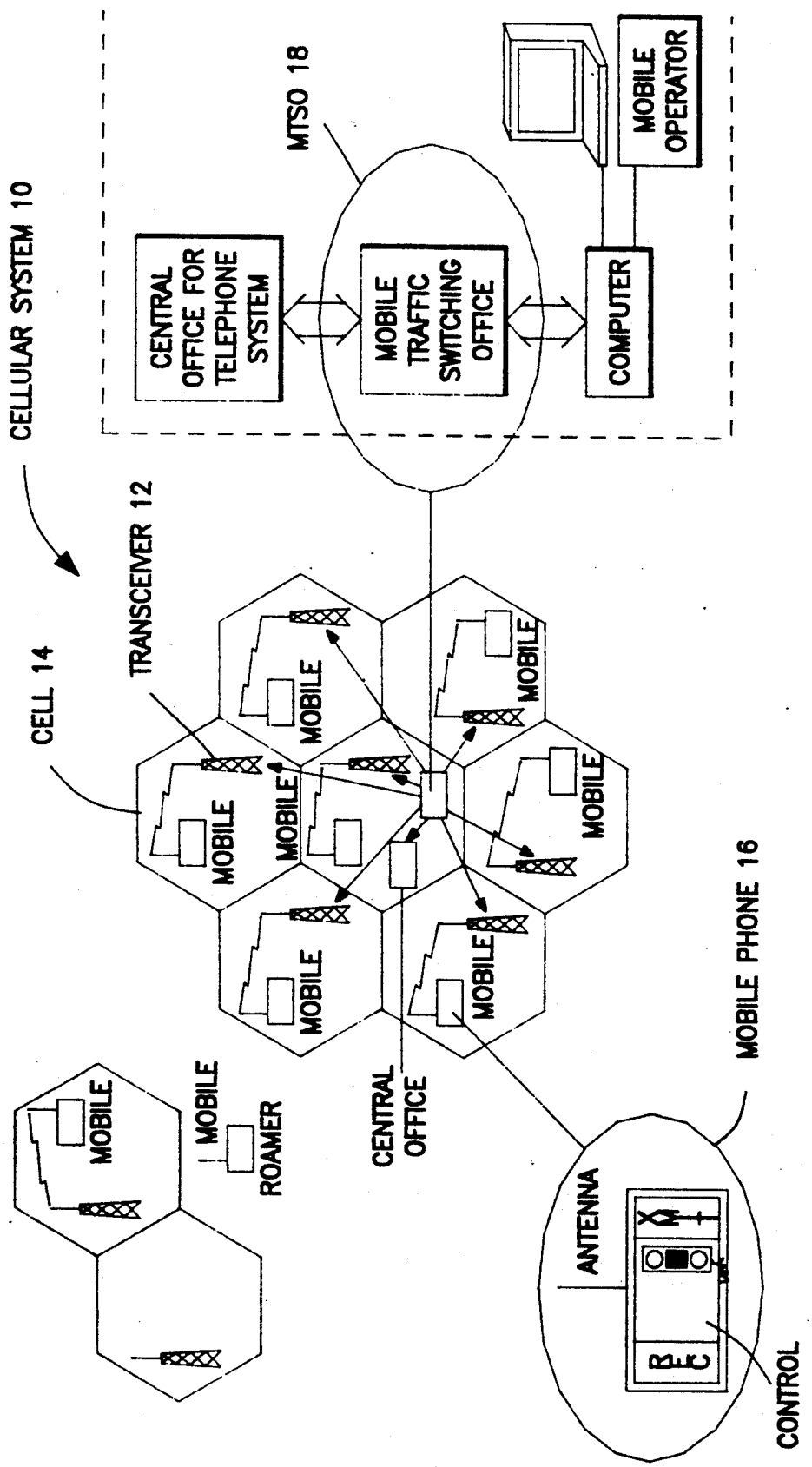
FIG. 1 is a diagram of a cellular telephone system.

In the following description of the preferred embodiment, reference is made to the accompanying drawings which form a part hereof, and in which is shown by way of illustration a specific embodiment in which the invention may be practiced. It is to be understood that other embodiments may be utilized and changes may be made without departing from the scope of the present invention.

The present invention provides a cellular 800 service similar to the existing WATS/800 service provided by land telephone networks. The cellular 800 service allows a cellular customer to dial a land-based Third Party Advertiser (TPA) with no associated air-time usage charges. The goal of the present invention is to use existing cellular billing systems, which only allow the billing of actual cellular numbers for air-time usage charges. Typically, such systems provide no means for making a TPA a "cellular" customer for billing purposes, so that the TPA may be charged for the cellular customer's air-time usage. However, in the present invention, the charges that the cellular customer incurs are billed instead to the TPA that the customer is calling.

The present invention uses number translation capabilities in the cellular switches to eliminate capacity constraints. Typically, a translation identifies a special number, such as an abbreviated "star" number like *411, and replaces it with another number in a world number format, e.g., 1 (213) 555-1212. Such translations present a major impediment to cellular 800 service, because cellular switches have limited capacity in their translation tables. This means that the cellular telephone system would be limited to only offering cellular 800 service to a relatively few TPAs. Market research, however, indicates that the cellular 800 service has broad appeal, and that thousands of TPAs may desire the service. Further, traversing these tables affects all calls made through the switch, so that the overhead associated with searching tables filled with TPA numbers would be borne by all calls.

To satisfy the potential demand, the present invention dramatically increases the number of TPAs that can use cellular 800 service. In the method of the present invention, a cellular cstomer dials a *800xxxx number, wherein xxxx represents some combination of symbols of arbitrary length identifying a specific TPA. A switch configured according to the present invention uses the leading *800 portion of the *800xxxx number as an access code to direct the call to a special outgoing trunk. The switch then strips the leading *800 portion from the *800xxxx number, and replaces it with a dialing prefix, e.g., (500) 500 - xxxx, before making a call through the outgoing trunk. Capacity constraints are thus eliminated because a large number of dialing sequences can be constructed in such a manner. In the above example, 10,000 dialing sequences are possible, i.e., (500) 500-0000 through (500) 500-9999.

The present invention also solves the problem of billing the TPA even though they are a land-based customer and not a cellular customer. This is accomplished by assigning TPAs a mobile phone number and electronic serial number (ESN), thereby making them cellular customers. The number dialed by the switch out through the special trunk is the TPA's mobile phone number, e.g., (500) 500 - xxxx in the above example. Using a call forwarding feature in the switch, calls received by the TPA's mobile phone number are then routed directly to the TPA's land-based phone number. Two billing records are thus created out of one call: the first billing record is for the cellular customer who dials the *800xxxx number; and the second billing record is for the TPA's mobile phone number. Using these billing records, the TPA can be billed for air-time usage during the cellular customer's call to the TPA and the cellular customer who dials the *800xxxx number receives air-time usage at no charge. Thus, the present invention permits the use of existing billing capabilities with no changes required.

The present invention "piggy-backs" the above-discussed number translations and routing determinations on a single switch to minimize the resources required to implement cellular 800 service and to isolate the call from external facilities. By connecting two ports of a switch together and routing calls out one port and then immediately back into the other port, the switch acts as two separate switches. The number translations and routing determinations required to provide the cellular 800 service use considerable processing time in the switch, but the impact on most other calls is minimal. In addition, no special trunking is needed to transfer calls between switches, thereby enhancing trunking efficiency. Further, each switch works independently of all other switches, so that no one switch is assigned the responsibility of maintaining a centralized repository for such translations. This eliminates any tie-up of switch resources due to intermachine trunking and also reduces dual trunking dependency. Thus, no additional external facilities are required to handle the cellular 800 service other than what is needed for a typical cellular call.

FIG. 1 is a diagram of a typical cellular telephone system 10. The basic concept of the cellular telephone system 10 is to increase the availability of mobile telephone service, which always has been a scarce luxury, by reducing the area covered by a transceiver 12 by reducing the power of transmission. In this way, concentrated areas of population can have more transceivers 12, and thus more channels, because each transceiver 12 handles a given number of conversations. In addition, because the transceivers 12 cover less area, the same frequency can be re-used in a common geographical area.

Within a cellular telephone system 10, a service area is divided into regions called cells 14, each of which has the necessary equipment to switch, transmit, and receive calls to/from any cellular customer located in the cell. A transceiver 12 in each cell 14 can transmit and receive on a plurality of FM channels in a specified frequency range simultaneously.

Each cell 14 has at least one setup channel dedicated for signaling between the cell 14 and its cellular customers. The remaining channels are used for conversation. Each channel may be used for many simultaneous conversations in cells 14 which are not adjacent to one another, but are far enough apart to avoid excessive interference. Thus, a system 10 with a relatively small number of subscribers can use large cells 14, and as demand grows, the cells 14 are divided into smaller ones.

A cellular telephone 16 consists of a control unit, a transceiver, and appropriate antennas. The transceiver contains circuits that can tune to any of the channels assigned to the cellular system 10. Each cellular telephone 16 has a unique electronic serial number (ESN). Additionally, each cellular telephone 16 is assigned a 10-digit telephone number, identical in form to any other telephone number.

Callers to the cellular telephone 16 dial the local or long-distance number desired to connect to the cellular telephone 16. The cellular customer likewise dials the local or long-distance number, where applicable, as if calling from a fixed telephone. The cellular customer is typically charged a monthly connect charge as well as air-time usage charges for either incoming or outgoing calls.

Cells 14 are interconnected and controlled by a central Mobile Telecommunications Switching Office (MTSO) 18, which is basically a telephone switching office as far as hardware is concerned, but includes a substantial amount of additional digital equipment programmed for cellular control. The MTSO not only connects the system 10 to the land telephone network, but also records call information for billing purposes.

Figure 2:
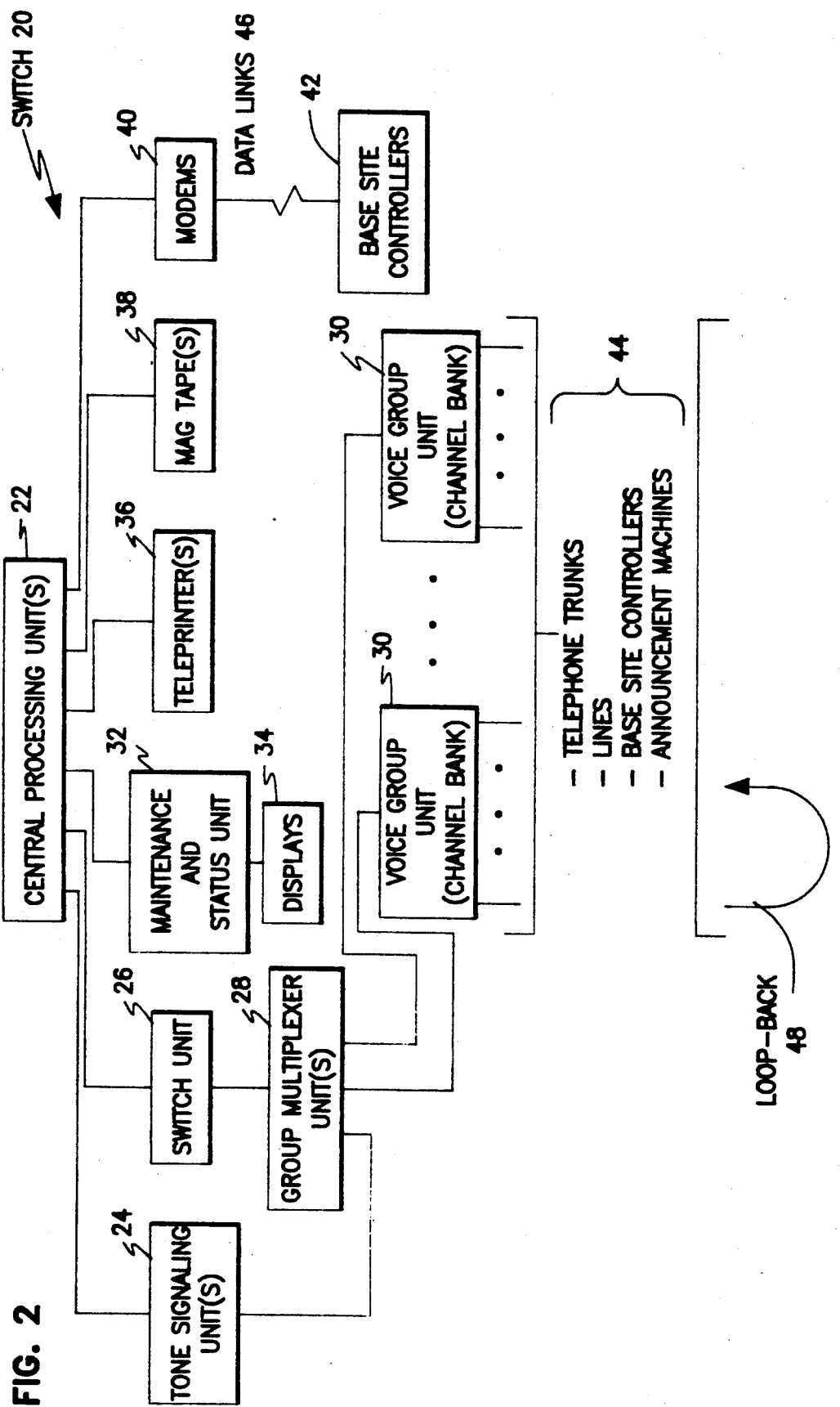
FIG. 2 is a diagram of a cellular switch illustrating the hardware components thereof.

FIG. 2 illustrates the components of a cellular switch 20 in a MTSO. The cellular switch 20, e.g., the Motorola EMX series of switches, consists of a CPU 22, tone signalling units 24, switch units 26 controlling group multiplexor units 28 and voice group units 30 for connection to telephone trunks, lines, base site controllers, and announcement machines, maintenance and status units 32 including displays 34, teleprinters 36, tape drives 38, and modems 40 connecting the switch 20 to base site controllers 42 which interface the switch 20 to the radiotelephone equipment in each cell and provide the translation between data messages to and from the switch 20 and digital signalling to and from the cellular telephone. The switch 20 is linked to the cells by a group of voice trunks 44 for conversations, together with one or more data links 46 for signaling and control. In the present invention, the switch 20 also includes at least one loop-back trunk 48 consisting of two ports of the switch 20 connected together, so that a call transmitted out the first port is received immediately by the same switch 20 at the second port.

The cellular switch 20 is designed specifically for radiotelephone service, and therefore, has capabilities not found in central offices in land telephone network (handoff, roamer files, air-time records, etc.). Nevertheless, it offers a selection of subscriber features found in most telephone exchanges, including Call Waiting, No-answer Transfer, Call Forwarding and Three-Party Conferencing.

When handling calls made from the cellular telephone to a land party, the switch 20 verifies the cellular telephone's phone number and serial number and seizes one of the available trunk circuits 44. After receiving the appropriate signal from the central office of the land telephone network, it forwards the number of the land party being called.

When handling calls made from a land party to the cellular telephone, the land party dials the mobile number and the telephone network routes the call to the central office serving the switch 20. After receiving the digits, the switch 20 verifies and then forwards the digits on the data lines 46 to the base site controllers 42. Call processing software within the switch 20 performs the functions of responding to call events, establishing path connections, and collecting call data for billing purposes.

Figure 3:
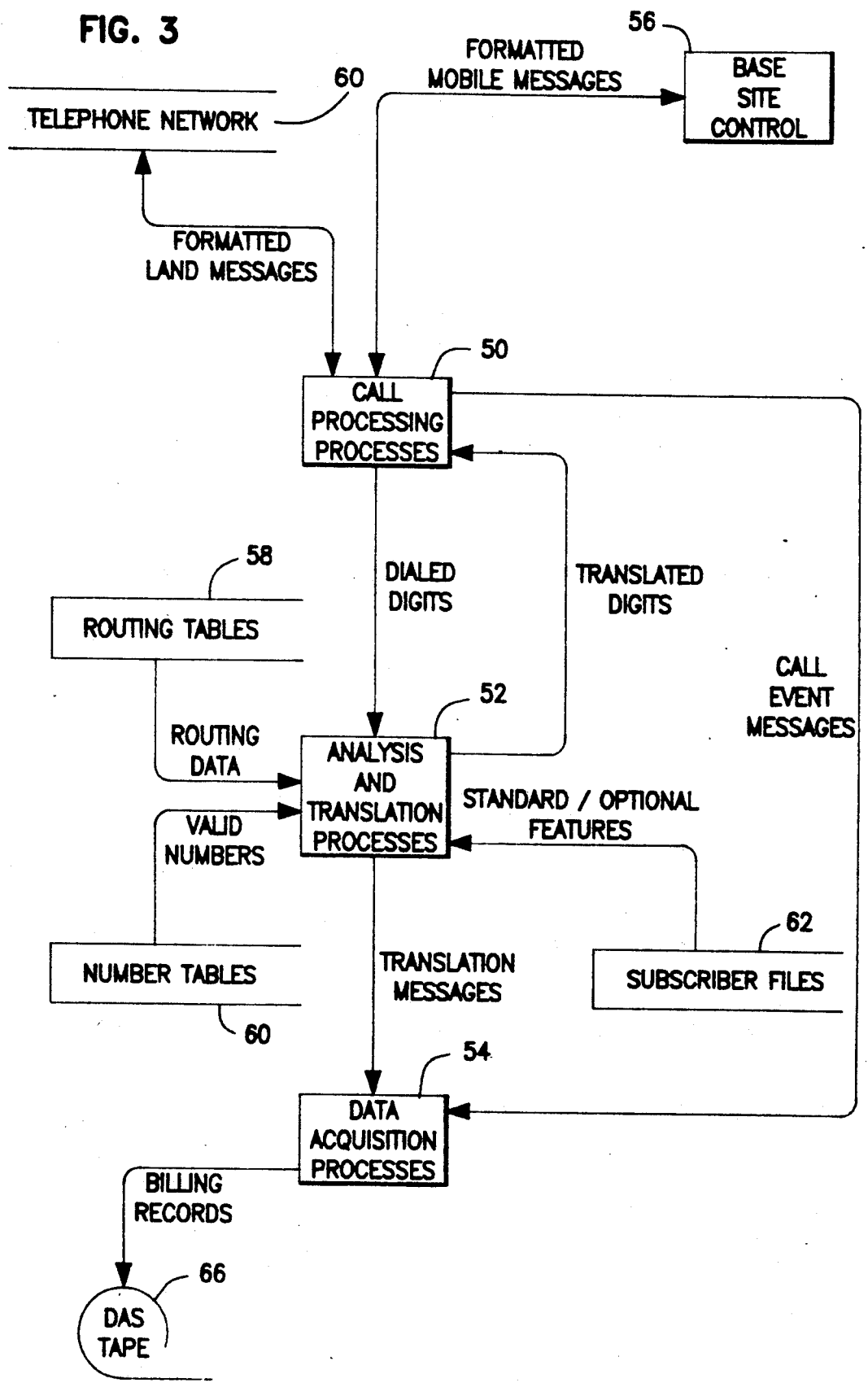
FIG. 3 is a dataflow diagram illustrating the messages passed between various software processes executing in the switch.
Figure 4:
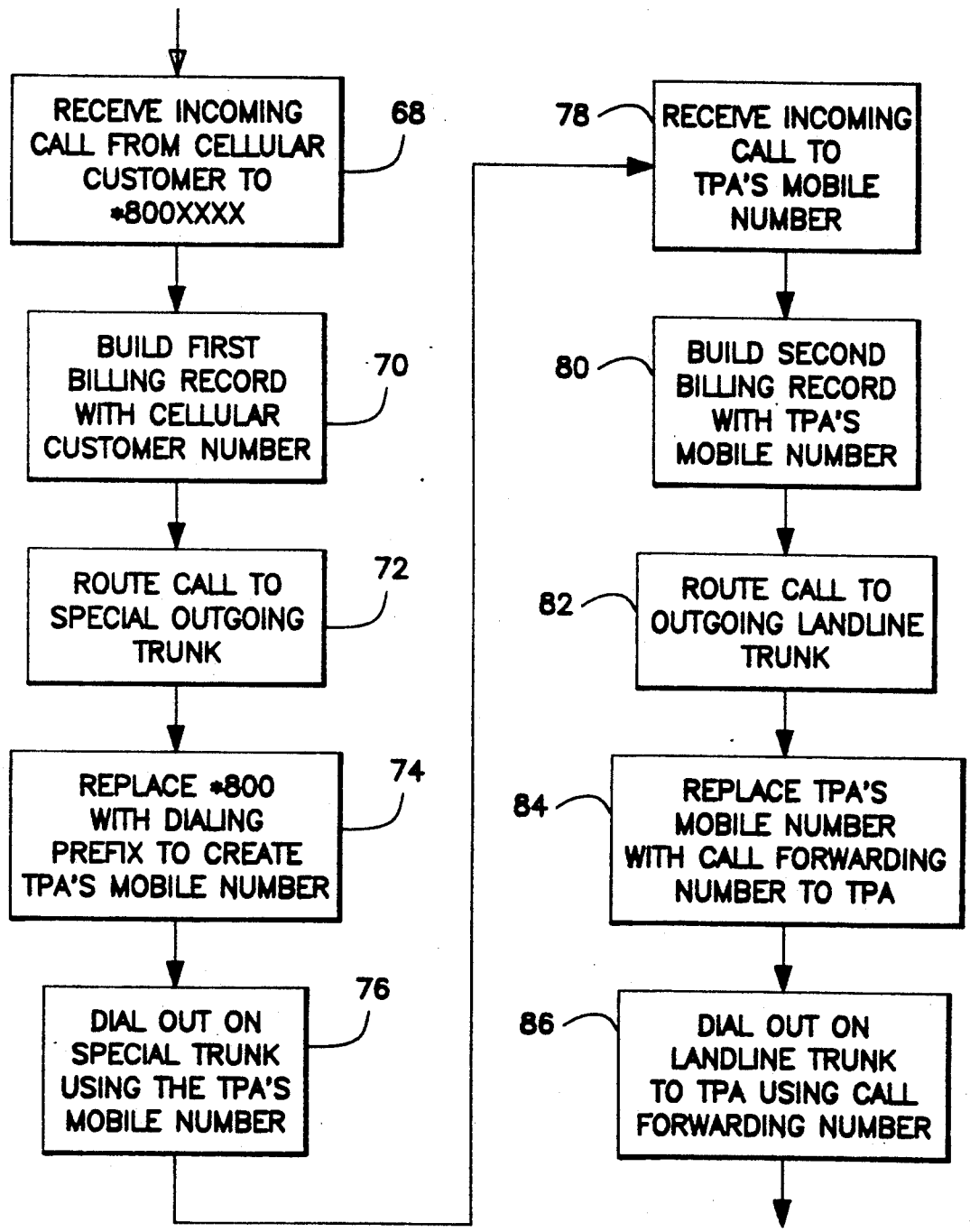
FIG. 4 is a flow chart illustrating the steps performed by method of the present invention.

FIG. 3 is a dataflow diagram illustrating the principal software processes operating within the switch, including call processing software 50, analysis and translation software 52, and data acquisition software 54. FIG. 4 is a flowchart further illustrating the steps performed by the software processes operating within the switch.

The software processes operate in an event/response environment. Clocked, sequential and single task processes are activated as various call events occur. When an event occurs, such as an off-hook condition, interface devices convert the line signals into formatted messages. The messages are then directed to the appropriate software processes to be acted upon. For example, the response to an off-hook condition results in several events occurring: 1) send an acknowledgement message; 2) wait for digits; 3) mark a trunk busy; 4) complete the connection; etc. All of these events invoke some type of response from the software processes. The type of response is based on line signals and states, time, and other data.

In the present invention, when the cellular customer dials *800xxxx,, the call processing software 50 receives a message from the cell via the base site controller 56 (step 68 of FIG. 4). This message contains the dialed digits string *800xxxx, as well as other information. The call processing software 50 transmits the message to the data acquisition software 54 for billing (step 70 of FIG. 4), and to the analysis and translation software 52 for routing determination and number translation (steps 72 and 74 of FIG. 4).

The analysis and translation software 52 tests, verifies, and translates the values contained within the message using routing tables 58 and number tables 60. The analysis and translation software 52 determines the appropriate trunk required to complete the call (step 72 of FIG. 4). The analysis and translation software 52 also strips the leading *800 portion from the dialed digits string *800xxxx, and replaces it with a specified dialing prefix, e g., (500) 500, thereby constructing the TPA's mobile phone number, e.g., (500) 500-xxxx (step 74 of FIG. 4). The analysis and translation software 52 returns a message to the call processing software 50, which message includes the outgoing trunk and the translated digits string. The call processing software 50 selects the appropriate outgoing trunk required to establish a path connection.

Normally, the path connection would be between the switch and another switch. However, in the present invention, the trunk "loops back" 48 as illustrated in FIG. 2 to connect to another port of the switch. The loop-back trunk 48 consists of two ports of the switch connected together, so that a call transmitted out the first port is received immediately by the same switch at the second port.

When the path is established, the translated digits are "outpulsed" on the first port of the trunk (step 76 of FIG. 4) and the call processing software 50 receives the outpulsed digits on the second port (step 78 of FIG. 4). The received message contains the outpulsed digits which comprise the TPA's mobile phone number, e.g., (500) 500-xxxx. The call processing software 50 transmits the message to the data acquisition software 54 for billing (step 80 of FIG. 4), and to the analysis and translation software 52 for routing determination and number translation (steps 82 and 84 of FIG. 4).

The analysis and translation software 52 uses files 62 with individual subscriber information maintained therein. These files 62 identify service features for any subscriber in the system. Upon analyzing the contents of individual subscriber files 62 with respect to the dialed digits, the analysis and translation software 52 determines that the TPA's mobile phone number is to be "call-forwarded," determines the appropriate trunk required to establish a path connection (step 82 of FIG. 4), and translates the dialed digits into the TPA's land-based phone number (step 84 of FIG. 4). A message is then returned to the call processing software 50 including the outgoing trunk to select and the outpulse digit string for the TPA's land-based phone number. The call processing software 50 establishes a path connection between the switch and the central office of the land telephone network 64 on the specified trunk. The outpulse digit string is transmitted to the central office of the land telephone network 64 to complete the connection (step 86 of FIG. 4).

For both calls, i.e., (1) from the cellular telephone to the TPA's mobile phone number, and (2) from the TPA's mobile phone number to the TPA's land-based phone number, the call events are identified to the data acquisition software 54 for subsequent use in billing. The call events typically include call origination and disconnection, dialed digits, mobile telephone number and ESN, and the time and duration of the call. Because two calls are made, two sets of billing records 66 are generated. The two billing records are billed at different rates so that the TPA pays for the air-time usage charges incurred by the cellular customer.

FIG. 5 is a block diagram illustrating a billing record 88. In the first call from the cellular customer to the TPA's mobile phone number, the billing record 88 contains: (1) the cellular customer's phone number as the originating/primary phone number 90; (2) the cellular customer's electronic serial number 92; (3) the TPA's mobile phone number as the terminating phone number 94; (4) a call start time 96; (5) a call stop time 98; and (6) a call charge 100 indicating that air-time usage is not billed. In the second call from the TPA's mobile phone number to the TPA'and-based phone number, the billing record 88 contains: (1) the TPA's mobile phone number as the originating/primary phone number 90; (2) the TPA's mobile electronic serial number 92; (3) the TPA's land-based phone number as the terminating phone number 94; (4) a call start time 96; (5) a call stop time 98; and (6) a call charge 100 indicating that air-time usage is billed.

The following paragraphs, in conjunction with Table I, describe the commands used to configure a Motorola EMX series switch to accomplish the present invention.

The CHANGE CP PRETRE command maintains the pretranslation translation tree. The first parameter, i.e., *800, identifies the dialed digits string to match; the second parameter, i.e., 245, identifies the index returned by a match; the remaining parameters perform other functions. The pretranslation tree is accessed by a dialed digits string, i.e., the *800xxxx number entered by the cellular customer. The tree is searched one digit at a time beginning with the leftmost position in the dialed digit string. The search ends when either all dialed digits have been used and a match made, or when the end of the tree is found. An index number is returned when a match is made. Thus, when the user enters a *800xxxx number, the pretranslation table returns an index number of 245.

The CHANGE CP OCOS command maintains the originating class of service (OCOS) table. The first parameter, i.e., 245, identifies the index returned by the pre-translation tree; the second parameter, i.e., 0, identifies the class of subscribers that may originate calls to the *800xxxx numbers; the remaining parameters perform other functions. The originating class of service table identifies the subscriber class types that are allowed to dial the *800xxxx numbers. Preferably, all classes of service can dial the *800xxxx numbers, except for classes which are not allowed to originate calls. Thus, the OCOS command is set for all the cellular customers who might want to call the *800xxxx numbers. It should be noted that Table I shows only the CHANGE CP OCOS command for a single class in the interest of brevity and clarity; additional classes would be specified in a similar manner.

THE CHANGE CP PREINX command maintains the pretranslator index table. The firs parameter, i.e., 245, identifies the index returned by the OCOS table; the second parameter, i.e., 8, identifies the number of digits expected; the ninth parameter, i.e., 245, identifies the logical ROUTE2 table; the remaining parameters perform other functions. The pretranslator index table is basically a "sifter" which verifies that the number dialed is an eight digit *800xxxx number. If the length is incorrect, then an error condition is generated. However, the pretranslator index table does not verify that the last four digits are valid numbers.

The CHANGE CP ROUTE2 command maintains the terminating class of service table. The first parameter, i.e., 245, identifies the index returned by the PREINX table; the second parameter, i.e., 0, identifies the class of subscribers that may terminate calls to *800xxxx; the remaining parameters perform other functions. The terminating class of service identifies which subscriber class types that are allowed to call the *800xxxx numbers. It should be noted that typically most subscriber classes would be permitted to be the destination of *800xxxx numbers. It should be noted that Table I shows only the CHANGE CP ROUTE2 command for a single class in the interest of brevity and clarity; additional classes would be specified in a similar manner.

The CHANGE CP PHYRTE command maintains the translator physical route table which is indexed by the ROUTE2 index. The second parameter, i.e., 245, is the ROUTE2 index returned by the ROUTE2 table; the fourth parameter, i.e., 245, identifies the route number which is an index to the OUTRTE table; the remaining parameters perform other functions. The physical route table establishes the trunk to use for dialing out of the switch with the TPA's mobile phone number. In the present invention, the physical route table identifies the outgoing "loop-back" port which causes the call to "piggy-back" on the switch.

. The CHANGE CP OUTRTE command maintains the translator outward route table which is indexed by the PHYRTE index. The first parameter, i.e., 245, identifies the physical route number which provides the index into the OUTRTE table; the third parameter, i.e., Y, identifies whether an outpulsing index associated with the OUTRTE table should be used; the fourth parameter, i.e., 245, identifies the outpulsing index; the fifth parameter, i.e., 1570, identifies the trunk group to route the call to; the remaining parameters perform other functions. This table defines the outpulsing index, the trunk group to route on, and other information.

The CHANGE CP OUTPLS command maintains the translator outpulsing digits table which is indexed by the outpulsing index supplied by the OUTRTE table. The first parameter, i.e., 245, identifies the outpulsing index; the seventh parameter, i.e., 4, identifies the number of digits to delete from the dialed digits string; the eighth parameter, i.e., 6, identifies the number of digits to prefix to the dialed digits string; the ninth parameter, i.e., 500500, identifies the prefix digits; the remaining parameters perform other functions. The OUTPLS table defines the number of digits to delete and prefix in the outpulsed digit string, i.e., how to communicate over the outgoing trunk. This is the point where the TPA's mobile telephone number is constructed by deleting the *800 prefix and inserting in its place the actual dialing prefix, e.g., (500) 500. Thus, when the four xxxx digits from the *800xxxx number are added to the dialing prefix, the result is the TPA's mobile phone number, i.e., (500) 500-xxxx. A block of mobile phone numbers corresponding to (500) 500-xxxx would typically be reserved and then parceled out as requested by TPAs.

The CHANGE CP INTRAN command maintains the land inward translation table. The first parameter, i.e., 1571, identifies the trunk group number; the remaining parameters perform other functions. This table defines the incoming portion of the "loop-back" trunk. When a call is received on the incoming trunk, it is handled like any other call and then call forwarded to the TPA's land-based phone number. The TPA's mobile phone number is created like any other new cellular customer account, with the call forwarding feature set to the TPA's land-based phone number.

This concludes the description of the preferred embodiment of the invention. The following paragraphs describe some alternative methods of accomplishing the same invention.

Rather than using a Motorola EMX series switch, those skilled in the art will recognize that switches manufactured by other companies could be substituted therefor to implement the present invention. For example, switches from AT&T, Ericsson, Northern Telecom, etc., could be used in place of the Motorola switch. However, a different switch would require commands different from those listed in Table I to configure the switch.

In summary, a piggy-back number and routing isolation method has been described which provides cellular 800 service. A cellular customer dials a *800xxxx number, wherein xxxx represents some combination of symbols of arbitrary length identifying a desired destination. A cellular switch uses the leading *800 portion of the dialed *800xxxx number as an access code to direct the call to a special trunk. The switch strips the leading *800 portion from the *800xxxx number and inserts in its place a dialing prefix before making a call through the special trunk. The number dialed by the switch out through the special trunk is the mobile phone number assigned to the TPA as a cellular customer. The special trunk "piggy-backs" the number translations and routing determinations by connecting together two ports of the single switch in a "loop-back" manner, so that calls routed out the first port are received immediately by the same switch at the second port. When the switch then receives the call coming in from the special trunk, it uses a call forwarding feature associated with the TPA's mobile phone number to route the call directly to the TPA's land-based phone number. Two billing records are thus created out of one call: the first billing record is for the cellular customer who dials the *800xxxx number; and the second billing record is for the TPA's mobile phone number.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE I

CHANGE CP PRETRE *800 245 N C
CHANGE CP OCOS 245 0 0 245 M
CHANGE CP PREINX 245 8 0 NORM 0 Y N N 245 N 0 0 0 C
CHANGE CP ROUTE2 245 0 0 245 M
CHANGE CP PHYRTE 1 245 P 245 N C
CHANGE CP OUTRTE 245 LAND Y 245 1571 0 00 N C
CHANGE CP OUTPLS 245 00 000 Y O NORMAL 4 6 500500 C
CHANGE CP INTRAN 1570 1 1 0 O N ; ; N 0 1 1 C

What is claimed is:

1. A piggy-back number and routing isolation method for a cellular telephone switch, comprising the steps of:
   (a) receiving a call from a cellular customer, wherein the call comprises an abbreviated dialing sequence identifying a third party, and wherein the abbreviated dialing sequence is comprised of a leading portion and a trailing portion;
   (b) routing the call to a special trunk using the leading portion of the abbreviated dialing sequence, wherein the special trunk comprises two ports of the cellular telephone switch connected together in a loop-back manner;
   (c) stripping the leading portion from the abbreviated dialing sequence and inserting in its place a dialing prefix, wherein a combination of the dialing prefix and the trailing portion of the abbreviated dialing sequence comprises a mobile phone number assigned to the third party;
   (d) dialing out on the special trunk using the mobile phone number assigned to the third party;
   (e) receiving a call from the special trunk to the mobile phone number, wherein the mobile phone number is configured for call forwarding to a land-based number assigned to the third party; and
   (f) call forwarding the call to the land-based number assigned to the third party.

2. The method of claim 1, further comprising creating first and second billing records, wherein the first billing record identifies the cellular customer dialing the abbreviated dialing sequence and the second billing record identifies the mobile phone number call-forwarding into the land-based number.

3. The method of claim 1, further comprising billing the third party for air-time usage incurred by the cellular customer's call to the third party.

4. The method of claim 3, wherein the cellular customer is not charged for the air-time usage incurred.

5. The method of claim 1, wherein the abbreviated dialing sequence comprises a *800xxxx number, wherein xxxx represents a combination of symbols of arbitrary length identifying a desired third party.

6. The method of claim 5, wherein the leading portion comprises *800.

7. The method of claim 5, wherein the trailing portion comprises xxxx.

8. An apparatus for piggy-back number and routing isolation in a cellular telephone switch, comprising:
   (a) a cellular telephone switch;
   (b) means within the cellular telephone switch for:
      (1) receiving a call from a cellular customer, wherein the call comprises an abbreviated dialing sequence identifying a third party, and wherein the abbreviated dialing sequence is comprised of a leading portion and a trailing portion;
      (2) routing the call to a special trunk using the leading portion of abbreviated dialing sequence, wherein the special trunk comprises two ports of the cellular telephone switch connected together in a loop-back manner;
      (3) stripping the leading portion from the abbreviated dialing sequence and inserting in its place a dialing prefix, wherein the combination of the dialing prefix and the trailing portion of the abbreviated dialing sequence comprises a mobile phone number assigned to the third party;
      (4) dialing out on the special trunk using the mobile phone number assigned to the third party;
      (5) receiving a call from the special trunk to the mobile phone number, wherein the mobile phone number is configured for call forwarding to a land-based number assigned to the third party; and
      (6) call forwarding the call to the land-based number assigned to the third party.

9. The apparatus of claim 8, further comprising means for creating first and second billing records, wherein the first billing record identifies the cellular customer dialing the abbreviated dialing sequence and the second billing record identifies the mobile phone number call-forwarding into the land-based number.

10. The apparatus of claim 8, further comprising means for billing the third party for air-time usage incurred by the cellular customer's call to the third party.

11. The apparatus of claim 10, wherein the cellular customer is not charged for the air-time usage incurred.

12. The apparatus of claim 8, wherein the abbreviated dialing sequence comprises a *800xxxx number, wherein xxxx represents a combination of symbols of arbitrary length identifying a desired third party.

13. The apparatus of claim 12, wherein the leading portion comprises *800.

14. The apparatus of claim 12, wherein the trailing portion comprises xxxx.

15. A method for routing calls through a telephone switch, comprising the steps of:
(a) receiving a call from a customer identifying a third party;
(b) routing the call to a special trunk comprised of two ports of the telephone switch connected together in a loop-back manner;
(c) translating a dialing string associated with the call into a first phone number assigned to the third party;
(d) dialing out on the special trunk using the first phone number assigned to the third party;
(e) receiving a call from the special trunk to the first phone number, wherein the first phone number is configured for call forwarding to a second number assigned to the third party; and
(f) call forwarding the call to the second number assigned to the third party.

16. The method of claim 15, further comprising creating first and second billing records, wherein the first billing record identifies the customer dialing the first phone number and the second billing record identifies the first phone number dialing the second phone number.

17. The method of claim 15, further comprising billing the third party for air-time usage incurred by the customer's call to the third party.

18. The method of claim 17, wherein the customer is not charged for the air-time usage incurred.

19. The method of claim 15, wherein the dialing string comprises a *800xxxx number, wherein xxxx represents a combination of symbols of arbitrary length identifying the third party.

* * * * *

UNITED STATES PATENT AND TRADEMARK OFFICE
CERTIFICATE OF CORRECTION

PATENT NO. : 5,216,703
DATED : June 1, 1993
INVENTOR(S) : Alfred A. Roy

It is certified that error appears in the above-identified patent and that said Letters Patent is hereby corrected as shown below:

Column 6, line 65, "TPA' and-based" should read --TPA's land-based--. Column 7, line 9, after the word "pretranslation" strike "translation"; line 41, "firs" should read --first--.

Signed and Sealed this

Fifteenth Day of March, 1994

Attest:

BRUCE LEHMAN

Attesting Officer

Commissioner of Patents and Trademarks